US005489078A

United States Patent [19]
Risley

[11] Patent Number: 5,489,078
[45] Date of Patent: Feb. 6, 1996

[54] CONTAINER CLIP

[76] Inventor: Nathaniel H. Risley, P.O. Box 3675, Chico, Calif. 95927

[21] Appl. No.: 316,877

[22] Filed: Oct. 3, 1994

[51] Int. Cl.$^6$ ................................................ A47B 96/06
[52] U.S. Cl. ................ 248/231.81; 248/215; 248/309.1; 248/316.7; 24/335; 224/312; 224/247
[58] Field of Search ........................... 248/215, 309.1, 248/316.7, 231.81; 224/312, 247, 252; D12/417; 24/338, 335, 563; 81/9.4

[56] References Cited

U.S. PATENT DOCUMENTS

| | | | |
|---|---|---|---|
| 2,306,174 | 5/1941 | Mallory | D12/417 |
| 5,082,225 | 1/1992 | Nespoli | 248/231.8 |
| 5,195,668 | 3/1993 | Kunes et al. | 248/215 |
| 5,238,163 | 8/1993 | Leach et al. | 224/312 |

*Primary Examiner*—Leslie A. Braun
*Assistant Examiner*—Gwendolyn Wrenn

[57] ABSTRACT

A one-piece clip shaped into open ended paralleling first and second sections attaches to the free side edge of an automobile sun visor. The first section is formed into a clip attachable to the sun visor. The second section is shaped into a holder for various small articles, in particular, a round moist snuff container.

8 Claims, 2 Drawing Sheets

CONTAINER CLIP

BACKGROUND OF THE INVENTION

1. Field of the Invention

This invention relates to clips that are designed to snap over interior automobile sun visors and hold items available for a motorist to use. Most of these items include sunglasses, note pads, auto registration slips, cigarette packages and the like. The present invention is particularly designed to snap over an automobile sun visor for holding a moist snuff container and other similar items.

2. Description of the Prior Art

Although there are many types of snap on clips for automobile visors shown in past art patents and available in the market place, no specialty clips in accordance with the present invention are seen. Automobile visor clips usually include such items as framed license holders and clip-on mirror attachments. As the area between the top surface of an automobile visor and the inside upholstering of the car is comparably small, clips that hold other than flat items must be specially designed or arranged to hold items on the down side of the visor when the visor is in the up position.

SUMMARY OF THE INVENTION

Therefore, the present invention is particularly directed towards holding a round snuff box, referred to interchangeably hereinafter as a moist snuff container, in a handy position for the car driver. Even so, the clip of this invention will also hold a variety of other small items, such as cigarette packages and the like as well as moist snuff containers to any vehicle equipped with sun visors. My clip design is also useful for holding small items affixed to any surface having a narrow accessible edge. In accordance with the invention, my clip is one-piece of flat continuous material approximately seven/eight of an inch wide shaped into two paralleling sections. The two sections have opposite opened ends. A first section is sized for attachment to a free side edge of an automobile sun visor. A second section is sized for holding a container removable. This produces two U-shaped sections, one above the other. The upper section is narrower than the lower one and is rounded back to form a clip-on end. The lower section has a straight wall at a vertical end and a widened base along a lower side ending at the opened end. The base of the clip visible from the driver side is flattened so a logo or some advertising can be displayed on the showing surface. On an inside surface at the support lower end of the clip, there is a small sharpened point. This point is arranged in a position aligned with the opening between the top and the bottom of a moist snuff container. By twisting the moist snuff container around in the clip, the sharpened point will easily separate the container top from the container bottom. Although the container top remains in position, the container is open and the snuff is readily available to the user.

As a principal object, the present invention provides easy access to a container, particularly a round moist snuff container, in a handy position for the driver of a vehicle.

Another object of the invention is to provide a visor clip for holding a moist snuff container that has a device included to separate the top of the container from the bottom by twisting the moist snuff container around.

A further object of this invention is to provide a visor clip designed to hold small items in a handy storage position.

A still further object of this invention is to provide a snap on clip for holding a moist snuff container and other items that is useful on any surface having an accessible narrow edge.

Other objects and the many advantages of the present invention will become clear from reading the following specifications and comparing numbered parts described with the same numbered parts illustrated in the drawings.

BRIEF DESCRIPTION OF THE DRAWINGS

The drawings illustrating the clip of this invention in various views include.

DESCRIPTION OF THE PREFERRED EMBODIMENTS

Figure 1:
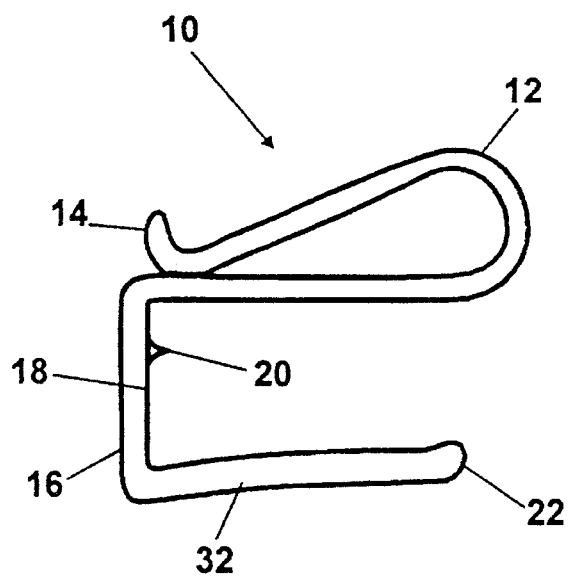
FIG. 1 showing a side view of the clip constituting the two sections of this invention. The sharpened point for opening a held container can be seen on the inside surface of the vertical lower wall left in the drawing. The vertical wall is in the lower container-holding section of the clip.

Referring now to the drawings at FIG. 1 where the invention, clip 10, is shown in a side elevation view. Clip 10 is formed from one-piece of flat continuous material approximately seven/eight of an inch wide shaped into two paralleling sections. The two sections have opposite opened ends. A looped attachment guide 14 in the upper section at a terminal end is angled up for easy slide attachment to any accessible flat edge. Attachment guide 14 is pressured downward against the top edge of container clamp 16 by the curved section of Snap-On clamp 12. Snap clamp 12 loops around into a flat area that continues a short distance then angles downward as container clamp 16. The inside vertical section of container clamp 16 has a sizing wall 18 that is opened to fit a round moist snuff container 24 (See FIG. 3). Sizing wall 18 has a seal separator 20, a sharpened edging positioned to align with the container sealer 26 of moist snuff container 24.

Clip 10 has a widened base 32 along the lower side that is slightly angled upward in the center and ends in a small upwardly looped terminal end, positioning tongue 22.

Figure 2:
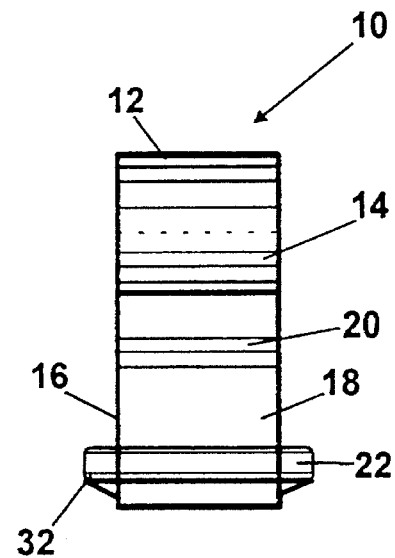
FIG. 2 showing the clip from an end view.

FIG. 2 shows clip 10 from in an end view looking into the open end. Attachment clamp 12 is at the top in the illustration and clip base 32 is at the bottom. In the FIG. 2 illustration, the approximate width of clip 10 can be seen relative to its height. Attachment guide 14 is just above seal separator 20. Seal separator 20 is in the upper section of sizing wall 18. Positioning tongue 22 is at the front of clip base 32. The approximate width of clip base 32 can also be seen in FIG. 2.

Figure 3:
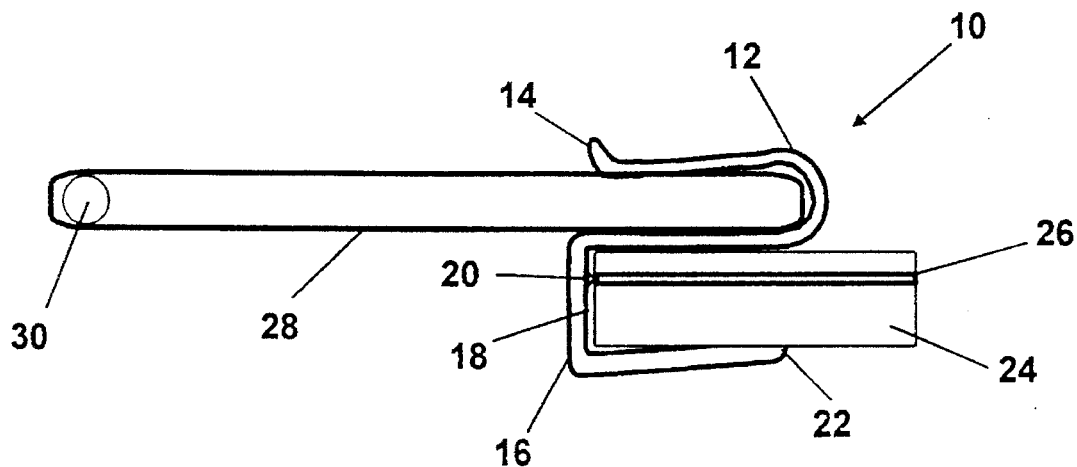
FIG. 3 showing the clip of this invention snapped over an automobile sun visor and holding a round moist snuff container.

FIG. 3 shows clip 10 attached to car sun visor 28 by attachment clamp 12. The turned up end of attachment guide 14 is upward in the illustration. Car sun visor 28 is shown horizontally aligned and attached to visor rod 30 is it would be when in the up position inside an automobile. Round moist snuff container 24 is held in clip 10 by container clamp 16. Container 24 fits into the area shown as sizing wall 18 and is secured temporarily by positioning tongue 22. Although container 24 could be a variety of small round containers or similar objects that would fit in clamp 10, the container illustrated is a moist snuff container. The illustrated container, designated container 24, has a seal rim 26. Clip 10 has a seal separator 20 for one-handed opening of seal rim 26 by rotating container 24. The upward curve of positioning tongue 22 pressing against the center of round moist snuff container 24 allows this rotation. Opening container 24 in this manner is easily accomplished and the contents of container 24 become readily available to the driver of an automobile who might use snuff.

Figure 4:
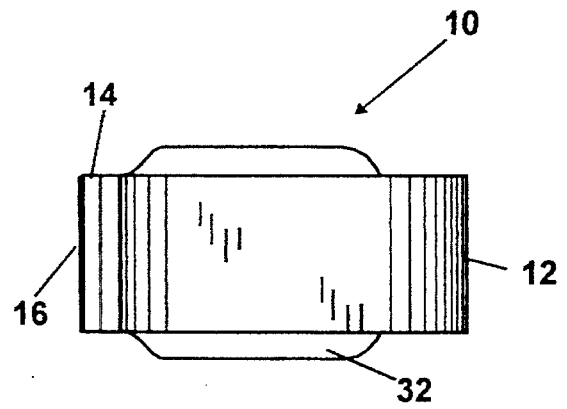
FIG. 4 showing a top plan view of the clip.

In the FIG. 4 top plan view of clip 10, attachment clamp 12 is illustrated to the right and container clamp 16 is to the left. The wider clip base 32 can be seen on the upper and lower sides of the upper body of clip 10. Attachment guide 14 is just visible above container clamp 16 left in the FIG. 4 illustration.

Figure 5:
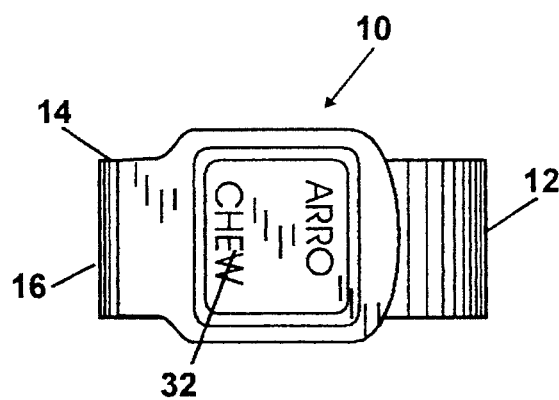
FIG. 5 showing a bottom plan view of the clip from the lower side surface of the widened base, and FIG. 6 showing a perspective view of the clip in use holding a round moist snuff container with the clip snapped onto the free side of an automobile sun visor.

In a bottom plan view of clip 10 in FIG. 5, the bottom surface of widened base 32 is seen facing the viewer. This area is available for trade names or advertising slogans. As the bottom surface of widened base 32 is visible when visor 28 is in the up position as shown in FIG. 3, this surface is ideal for advertising purposes.

Figure 6:
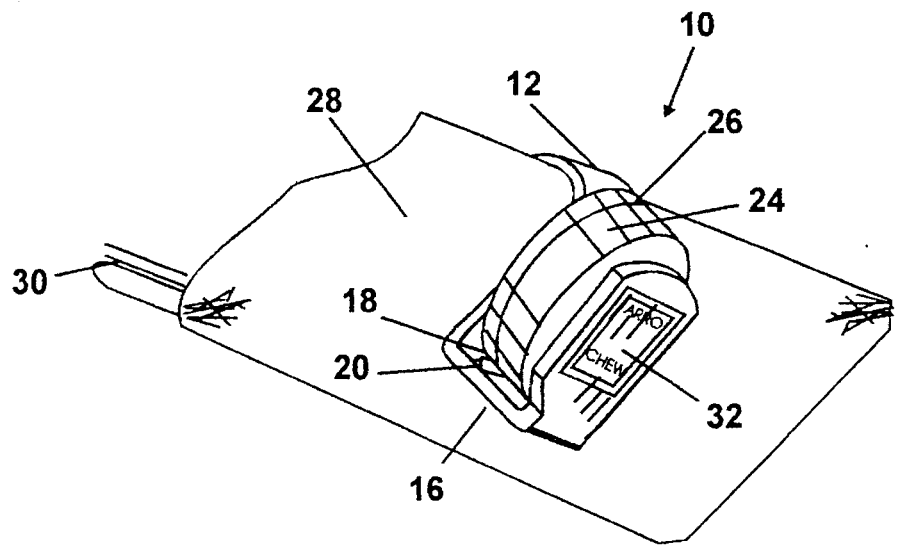

The perspective view of clip 10 attached to visor 28 in FIG. 6 shows clip 10 in use. Clip 10 is holding round moist snuff container 24 and is snapped onto the free end of automobile sun visor 28. Clip 10 is held to the free end of visor 28 by attachment clamp 12. Container 24 is held in clip 10 by container clamp 16 and base 32 on the bottom. Container 24 fits in the area maintained by sizing wall 18 with container seal 26 positioned against seal separator 20 ready for twist opening by the driver of the automobile. The foregoing should provide sufficient information for anyone skilled in the art to produce clip 10 and to understand its use.

Although I have described a principal embodiment of my invention with considerable detail in the foregoing specification and have illustrated it extensively in the drawings, it is to be understood that I reserve the right to practice variations in the invention that do not exceed the scope of the appended claims. Also, I shall consider any variation of the present invention practiced by others that falls within the scope of the claims following, to be one with my invention.

What is claimed is:

1. A one-piece clip attachable to an automobile sun visor, said clip shaped into two paralleling sections, said sections having opposite opened ends, comprising;
   a. a first section sized for attachment to a free side edge of an automobile sun visor;
   b. a second section sized for holding a container removable therein;
   c. means in said first section for removable snap on fitting to said automobile sun visor on said free side edge thereof;
   d. means in said second section for maintaining said container removable therein;
   e. means in said second section for maintaining said container ratable.
   f. means in said second section for splitting a seal in a rounded container wherein said means in said second section for splitting a seal in a rounded container includes an elongated triangular blade positioned in a vertical wall in said structure, said blade adapted to be aligned with an ordinary sealer on said container;
   g. said second section having a spacing wall adapted to fit said container;
   h. said second section having a widened base; and
   i. means providing visible viewing of text on said widened base.

2. The clip according to claim 1 wherein said means in said first section for removable snap on fitting to said automobile sun visor on said free side edge thereof includes a turned up attachment guide on terminal member of said clip at said opened end of said first section.

3. The clip according to claim 1 wherein said means in said first section for removable snap on fitting to said automobile sun visor on said free side edge thereof includes a turned up attachment guide at a terminal end of said clip at said opened end of said first section.

4. The clip according to claim 1 wherein said means in said first section for removable snap on fitting to said automobile sun visor on said free side edge thereof includes material resilience in the clip structure, said material being sufficiently pliable to release said clip for pull removal.

5. The clip of claim 1 wherein said means in said second section for maintaining said container removable therein includes a container clamp design in the shape of the clip structure and resilience in the clip material remembering a container holding position, said material being sufficiently pliable for pull release of said container.

6. The clip of claim 1 wherein said means in said second section for said maintaining said container ratable includes a terminal end at said opened end of said second section of said clip angled up to press centrally against the bottom of said container providing a pivotal point allowing rotational movement of said container.

7. The clip of claim 1 wherein said second section having said spacing wall includes a measured wall in a straight section of said second section providing an opening in said second section of said clip sized for acceptance of said container when said container is of the type usually referred to as a moist snuff container.

8. The clip of claim 1 wherein said means providing visible viewing of text on said widened base is an exposed surface of

* * * * *